United States Patent [19]

Ueno et al.

[11] Patent Number: 4,684,712

[45] Date of Patent: Aug. 4, 1987

[54] PROCESS FOR PRODUCING WHOLLY AROMATIC POLYESTERS

[75] Inventors: Ryuzo Ueno, Nishinomiya; Kazuyuki Sakota, Kobe; Yasunori Nakamura, Nishinimiya, all of Japan

[73] Assignee: Kabushiki Kaisha Ueno Seiyaku Oyo Kenkyujo, Osaka, Japan

[21] Appl. No.: 871,314

[22] Filed: Jun. 6, 1986

Related U.S. Application Data

[63] Continuation-in-part of Ser. No. 656,004, Oct. 1, 1984, abandoned, which is a continuation of Ser. No. 526,343, Aug. 24, 1983, abandoned.

[30] Foreign Application Priority Data

Sep. 2, 1982 [JP] Japan .................................. 57-151711

[51] Int. Cl.$^4$ .............................................. C08G 63/02
[52] U.S. Cl. ..................................... 528/190; 528/193; 528/194
[58] Field of Search ........................ 528/190, 193, 194

[56] References Cited

U.S. PATENT DOCUMENTS

| | | | |
|---|---|---|---|
| 4,219,461 | 8/1980 | Calundann | 528/190 |
| 4,256,624 | 3/1981 | Calundann | 528/190 |
| 4,318,841 | 3/1982 | East et al. | 528/190 |
| 4,318,842 | 3/1982 | East et al. | 528/190 |
| 4,337,190 | 6/1982 | Calundann | 528/190 |
| 4,347,349 | 8/1982 | Siemionko | 528/190 |
| 4,359,569 | 11/1982 | Siemionko | 528/190 |
| 4,370,466 | 1/1983 | Siemionko | 528/190 |
| 4,393,191 | 7/1983 | East | 528/190 |
| 4,395,513 | 7/1983 | Calundann | 528/190 |
| 4,522,974 | 6/1985 | Calundann et al. | 528/190 |

*Primary Examiner*—Lucille M. Phynes
*Attorney, Agent, or Firm*—Sherman and Shalloway

[57] ABSTRACT

Wholly aromatic polyesters having improved mechanical properties are produced by polycondensing a raw material or raw material mixture capable of forming an aromatic polyester and not more than about 18 mole %, based on the total amount of the entire raw materials, of 2-hydroxynaphthalene-6-carboxylic acid or its derivative.

6 Claims, No Drawings

PROCESS FOR PRODUCING WHOLLY AROMATIC POLYESTERS

This application is a continuation-in-part of our copending application Ser. No. 656,004 filed on Oct. 1, 1984, which is a continuation of our abandoned application Ser. No. 526,343 filed on Aug. 24, 1983.

This invention relates to an improvement in a process for producing aromatic polyesters.

Wholly aromatic polyesters have been known, and, for example, homo- and copolymers of p-hydroxybenzoic acid have already been manufactured and marketed. These polymers have the defect that they have a low molecular weight, and because of their relatively high melting points or their lower decomposition temperatures than their melting points, they are difficult to process or fabricate. Furthermore, these polymers cannot be formed into practical fibers by a melt-extrusion method. For example, fibers obtained by melt-extrusion at very high temperatures generally have an empty internal structure and a low tensile strength.

To overcome these defects, various new wholly aromatic polyesters have been proposed heretofore. They include, for example, polyesters derived from aromatic dicarboxylic acids and aromatic diols, and polyesters derived from aromatic dicarboxylic acids, aromatic hydroxycarboxylic acids and aromatic diols. These wholly aromatic polyesters have not proved to be entirely satisfactory, and have the disadvantage that they have a low molecular weight and tend to undergo decomposition rather than melting, and because of non-uniformity in the polymerization reactions, polymers having fixed properties are difficult to obtain.

It is an object of this invention to provide wholly aromatic polyesters which are free from these defects and disadvantages.

In order to achieve this object, the present inventors have made various investigations, and have found that when a small amount of 2-hydroxynaphthalene-6-carboxylic acid is added as one polymer component to an aromatic polyester-forming system, the viscosity of the system decreases and the reaction proceeds smoothly, and that as a result, the arrangement of the repeating units of the polymer becomes steady and the resulting polyester has improved mechanical properties.

Thus, according to this invention, there is provided a process for producing an aromatic polyester, which comprises polycondensing a raw material or raw material mixture capable of forming an aromatic polyester and not more than about 18 mole %, based on the amount of the entire raw materials, of 2-hydroxynaphthalene-6-carboxylic acid or its derivative.

The raw material or raw material mixture capable of forming an aromatic polyester in this invention may be any one of the following materials (a), (b) and (c).

(a) An aromatic hydroxycarboxylic acid other than 2-hydroxynaphthalene-6-carboxylic acid, or its derivative.

(b) A mixture of an aromatic dicarboxylic acid or its derivative and an aromatic diol or its derivative.

(c) A mixture of an aromatic dicarboxylic acid or its derivative, an aromatic diol or its derivative, and an aromatic hydroxycarboxylic acid other than 2-hydroxynaphthalene-6-carboxylic acid or its derivative.

The amount of 2-hydroxynaphthalene-6-carboxylic acid or its derivative used differs for the above materials (a), (b) and (c). For the materials (a) and (b), it is not more than 10 mole %, preferably 1 to 10 mole %, especially preferably 5 to 10 mole %, based on the total amount of the starting materials (including 2-hydroxynaphthalene-6-carboxylic acid or its derivative). In the case of the material (c), the amount is not more than about 18 mole %, preferably about 1 to about 18 mole %, especially preferably about 1 to about 15 mole %, based on the total amount of the starting materials (including 2-hydroxynaphthalene-6-carboxylic acid or its derivative). Amounts exceeding these limits are economically undesirable since 2-hydroxynaphthalene-6-carboxylic acid or its derivative is relatively expensive. In addition, they rather result in a reduction in the effect of carrying out the reaction smoothly. Such excessive amounts should therefore be avoided. Needless to say, in any of the above cases, the amounts of the individual starting materials should be selected such that the total amount of the alcohol component becomes equivalent to the total amount of the acid component.

Examples of the aromatic hydroxycarboxylic acid other than 2-hydroxynaphthalene-6-carboxylic acid and its derivatives include p-hydroxybenzoic acid, 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4-hydroxybenzoic acid, 2-methyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 2-phenyl-4-hydroxybenzoic acid, 3-phenyl-4-hydroxybenzoic acid, 1-hydroxynaphthalene-4carboxylic acid, 1-hydroxynaphthalene-5-carboxylic acid, 2-hydroxynaphthalene-7-carboxylic acid and m-hydroxybenzoic acid.

Examples of the aromatic dicarboxylic acid and its derivatives include terephthalic acid, naphthalene-1,4-dicarboxylic acid, naphthalene-1,5-dicarboxylic acid, naphthalene-2,6-dicarboxylic acid, naphthalene-2,7-dicarboxylic acid, 4,4'-hydroxybisbenzoic acid, 4,4'-ethylenedioxy-bisbenzoic acid, 4,4'-thiobisbenzoic acid, isophthalic acid, and compounds resulting from the bonding of a halogen atom, a lower alkyl group or a lower alkoxy group to the aromatic rings of these aromatic dicarboxylic acids.

Examples of the aromatic diol and its derivatives include 4,4'-biphenol, hydroquinone, resorcinol, bisphenol A, 1,1'-thio-4,4'-biphenol, naphthalene-1,4-diol, naphthalene-1,5-diol, naphthalene-2,6-diol, naphthalene-2,7-diol, 3,3'-biphenol, compounds resulting from the bonding of a halogen atom, a lower alkyl group or a lower alkoxy group to the aromatic rings of these diols, and acetates, lower alkyl esters and phenyl esters of these diols.

Examples of the derivatives of 2-hydroxynaphthalene-6-carboxylic acid include compounds resulting from the bonding of a halogen atom, a lower alkyl group or a lower alkoxy group to the aromatic ring of 2-hydroxynaphthalene-6-carboxylic acid, and compounds resulting from replacing the hydroxyl and/or carboxyl group of 2-hydroxynaphthalene-6-carboxylic acid by an alkylcarbonyloxy, alkyloxycarbonyl, or aryloxycarbonyl group.

The polycondensation reaction of the starting materials is carried out by using a known ester interchange catalyst in an amount of about 0.001 to 1% by weight, preferably about 0.01 to about 0.2% by weight, based on the total weight of the starting materials. The ester interchange catalyst includes, for example, dialkyltin oxides, diaryltin oxides, titanium dioxide, titanium alkoxides, alkoxytitanium silicates, alkali metal or alkaline earth metal carboxylates, gaseous acid catalysts, Lewis acids such as $BF_3$, and hydrogen halides such as hydrogen chloride. The reaction can be carried out by various known methods for obtaining random copolymers, block copolymers or highly ordered copolymers. A bulk polymerization technique and a suspension polymerization technique using a suitable heat medium can both be used. The reaction temperature is 150° to 400° C., preferably 200° to 400° C., especially preferably 250° to 350° C. Vacuum may be used to facilitate removal of volatile components formed in the final stage of the condensation, such as acetic acid, water, alcohols, and phenol.

The wholly aromatic polyester obtained by the method of this invention has an intrinsic viscosity, measured at 60° C. for its solution in pentafluorophenol in a concentration of 0.01% by weight, of usually at least about 0.4, preferably at least about 1.0, for example, 1.0 to 7.5, and a weight average molecular weight of about 2,000 to 200,000, preferably about 10,000 to about 50,000. The molecular weight of this wholly aromatic polyester can be increased by subjecting it to a solid-state polymerization operation. For example, when the wholly aromatic polyester in the form of granules, fibers or a film is heated at a temperature below its melting point in an atmosphere of an inert gas such as nitrogen for several minutes to several days, if desired under reduced pressure, its molecular weight increases.

Since the wholly aromatic polyester obtained by the process of this invention can form a thermotropic molten phase, it can be easily formed into various molded articles such as fibers, films and other three-dimensional molded articles. Fibers are particularly advantageously used as tire cords, and also find applications as conveyor belts, hoses, cables and resin reinforcing materials. Films can be used as packaging tapes, cable wrappings, magnetic tapes, and electrically insulating films. Other three-dimensional molded articles include, for example, machine parts, parts of electronic ovens, heating vessels.

The following non-limitative examples specifically illustrate the present invention. The property values given in these examples were measured in accordance with ASTM D256, D638 and D790. Unless otherwise specified, all the viscosity values of the polymers in these examples were measured at 60° C. for a solution of polymer in pentafluorophenol in a concentration of 0.1% by weight.

EXAMPLE 1

82.8 g (0.46 mole) of p-acetoxybenzoic acid and 9.2 g (0.04 mole) of 2-acetoxynaphthalene-6-carboxylic acid were stirred in a stream of nitrogen at 250° C. for 3 hours and then at 280° C. for 1 hour, and acetic acid was distilled off. Then, the degree of vacuum was raised gradually over the course of about 15 minutes at 310° C., and the reaction mixture was maintained at 0.1 torr for 30 minutes to terminate the reaction. After cooling, the polymer was finely pulverized and dried at 150° C. for 1 hour while passing air.

The resulting polymer (about 62 g) had an intrinsic viscosity of 5.8.

The polymer was melt-extruded into continuous filaments (about 15 denier/filament), and quenched in the outer atmosphere (20° C., relative humidity 65%). The resulting filaments had the following mechanical properties.

Tenacity: 16.6 g/denier
Tensile modulus: 570 g/denier
Elongation: 2.1%

When these filaments were heat-treated at 250° C. for 90 hours, they showed the following mechaical properties.

Tenacity: 23.2 g/denier
Tensile modulus: 590 g/denier
Elongation: 2.6%

These filaments showed low shrinkage at high temperatures, dimensional stability at temperatures between about 150° and 200° C. and excellent resistance to hydrolysis.

EXAMPLE 2

13.8 g (0.06 mole) of 2-acetoxynaphthalene-6-carboxylic acid, 126.9 g (0.47 mole) of 4,4'-biphenol diacetate and 91.18 g (0.47 mole) of dimethyl terephthalate were stirred in a stream of nitrogen at 250° C. for 4 hours and then at 280° C. for 1 hour, and acetic acid and methanol were distilled off. Then, the degree of vacuum was gradually raised at 320° C. over the course of about 20 minutes. The reaction mixture was maintained at 0.1 torr for 40 minutes to terminate the reaction. After cooling, the polymer was finely pulverized and dried at 150° C. for 1 hour while passing air.

The resulting polymer (about 158 g) had an intrinsic viscosity of 5.7.

The polymer was melt-extruded into continuous filaments (about 20 denier/filament), and quenched in the outer atmosphere (20° C., relative humidity 65%). The resulting filaments had the following mechanical properties.

Tenacity: 18.1 g/denier
Tensile modulus: 580 g/denier
Elongation: 1.9%

When these filaments were heat-treated at 250° C. for 90 hours, they showed the following mechanical properties.

Tenacity: 25.3 g/denier
Tensile modulus: 600 g/denier
Elongation: 2.5%

These filaments had low shrinkage at high temperatures, dimensional stability at temperatures between about 150° and about 200°C., and excellent resistance to hydrolysis.

EXAMPLE 3

27.0 g (0.15 mole) of p-acetoxybenzoic acid, 40.5 g (0.15 mole) of 4,4'-bisphenol diacetate, 29.1 g (0.15 mole) of dimethyl terephthalate and 11.5 g (0.05 mole) of 2-acetoxynaphthalene-6-carboxylic acid were stirred in a stream of nitrogen at 250° C. for 2.5 hours and then at 280° C. for 1 hour, and acetic acid and methanol were distilled off. The degree of vacuum was gradually raised at 310° C. over the course of about 10 minutes. The reaction mixture was maintained at 0.1 torr for 30 minutes to terminate the reaction. After cooling, the polymer was finely pulverized and dried at 150° C. for 1 hour while passing air.

The resulting polymer (about 72 g) had an intrinsic viscosity of 5.9.

The polymer was melt-extruded into continuous filaments (about 20 denier/filament), and quenched in the outer atmosphere (20° C., relative humidity 65%). The resulting filaments had the following mechanical properties.

Tenacity: 19.1 g/denier
Tensile modulus: 590 g/denier
Elongation: 1.8%

When these filaments were heat-treated at 250° C. for 90 hours, they showed the following mechanical properties.

Tenacity: 26.0 g/denier
Tensile modulus: 630 g/denier
Elongation: 2.4%

These filaments showed low shrinkage at high temperatures, dimensional stability at temperatures between about 150° and 200° C., and excellent resistance to hydrolysis.

EXAMPLE 4

27.0 g (0.15 mole) of p-acetoxybenzoic acid, 36.6 g (0.15 mole) of 2,6-bisacetoxy-naphthalene, 29.1 g (0.15 mole) of dimethyl terephthalate and 11.5 g (0.05 mole) of 2-acetoxynaphthalene-6-carboxylic acid were stirred in a stream of nitrogen at 250° C. for 1 hour and then at 280° C. for 1 hour, and acetic acid and methanol were distilled off. Then, the degree of vacuum was gradually raised at 320° C. over the course of about 10 minutes. The reaction mixture was maintained at 0.5 torr for 1 hour to terminate the reaction. After cooling, the polymer was finely pulverized, and dried at 150° C. for 1 hour while passing air.

The resulting polymer (about 70 g) had an intrinsic viscosity of 6.9.

The polymer was dried overnight under vacuum at 80° C., and injection-molded at 310° C. The molded article had the following properties.

Tensile break: 2,300 kg/cm$^2$
Elongation: 5.2%
Tensile modulus: $1.1 \times 10^5$ kg/cm$^2$
Flexural break: 1,600 kg/cm$^2$
Flexural modulus: $0.8 \times 10^5$ kg/cm$^2$
Notched Izod impact: 61.5 kg-cm/cm

EXAMPLE 5

34.2 g (0.19 mole) of p-acetoxybenzoic acid, 29.1 g (0.15 mole) of hydroquinone diacetate, 29.1 g (0.15 mole) of dimethyl terephthalate and 2.3 g (0.01 mole) of 2-acetoxynaphthalene-6-carboxylic acid were reacted in the same way as in Example 3. The resulting polymer (about 60 g) had an intrinsic viscosity of 4.7.

The polymer was melt-extruded into continuous filaments (about 20 denier/filament), and quenched in the outer atmosphere (20° C., relative humidity 65%). The resulting filaments had the following mechanical properties.

Tenacity: 12.6 g/denier
Tensile modulus: 486 g/denier
Elongation: 3.2%

When these filaments were heat-treated at 250° C. for 90 hours, they showed the following mechanical properties.

Tenacity: 17.6 g/denier
Tensile modulus: 498 g/denier
Elongation: 3.4%

These filaments had low shrinkage at high temperature, dimensional stability at temperatures between about 150° and about 200° C., and excellent resistance to hydrolysis.

COMPARATIVE EXAMPLE 1

135.0 g (0.50 mole) of 4,4'-biphenyl diacetate and 97.0 g (0.50 mole) of dimethyl terephthalate were stirred in a stream of nitrogen at 250° C. for 4 hours and then at 280° C. for 1 hour, and acetic acid and methanol were distilled off. Then, the degree of vacuum was gradually raised at 340° C. over the course of about 40 minutes. The reaction mixture was maintained at 0.1–0.2 torr for 1 hour to terminate the reaction. After cooling, the polymer was finely pulverized, and dried at 150° C. for 1 hour while passing air.

The resulting polymer (about 157 g) had an intrinsic viscosity of 1.2.

The polymer was melt-extruded into filaments (about 20 denier/filament), and quenched in the outer atmosphere (20° C., relative humidity 65%). The resulting filaments had the following mechanical properties.

Tenacity: 3.6 g/denier
Tensile modulus: 340 g/denier
Elongation: 2.8%

When these filaments were heat-treated at 250° C. for 90 hours, they showed the following mechanical properties.

Tenacity: 5.2 g/denier
Tensile modulus: 350 g/denier
Elongation: 2.8%

COMPARATIVE EXAMPLE 2

36.0 g (0.20 mole) of p-acetoxybenzoic acid, 40.5 g (0.15 mole) of 4,4'-biphenol diacetate and 29.1 g (0.15 mole) of dimethyl terephthalate were stirred in a stream of nitrogen at 250° C. for 2.5 hours and then at 280° C. for 1 hour, and acetic acid and methanol were distilled off. Then, the degree of vacuum was gradually raised at 320° C. over the course of about 20 minutes. The reaction mixture was maintained at 0.1–0.2 torr for 1 hour to terminate the reaction. After cooling, the polymer was finely pulverized, and dried at 150° C. for 1 hour while passing air.

The resulting polymer (about 71 g) had an intrinsic viscosity of 3.2.

The polymer was melt-extruded into filaments (about 20 denier/filament), and quenched in the outer atmosphere (20° C., relative humidity 65%). The resulting filaments had the following mechanical properties.

Tenacity: 5.3 g/denier
Tensile modulus: 320 g/denier
Elongation: 1.9%

When these filaments were heat-treated at 250° C. for 90 hours, they showed the following mechanical properties.

Tenacity: 7.5 g/denier
Tensile modulus: 370 g/denier
Elongation: 2.9%

EXAMPLE 6

117.0 g (0.65 mole) of p-acetoxybenzoic acid, 34.5 g (0.15 mole) of 2-acetoxynaphthalene-6-carboxylic acid, 24.6 g (0.10 mole) of 4,4'-biphenol diacetate and 16.6 g (0.10 mole) of terephthalic acid were stirred in a stream of nitrogen at 250° C. for 1 hour and then at 280° C. for 1 hour, and acetic acid was distilled off. Then, the degree of vacuum was gradually raised at 320° C. over the course of about 10 minutes. The reaction mixture was maintained at 0.5 torr for 1 hour to terminate the reaction. After cooling, the polymer was finely pulverized, and dried at 150° C. for 1 hour while passing air.

The resulting polymer (about 132 g) had an intrinsic viscosity of 7.3.

The polymer was dried overnight in vacuum at 80° C., and injection-molded at 300° C. The molded article had the following properties.
  Tensile break: 2,100 kg/cm$^2$
  Elongation: 3.2%
  Tensile modulus: 1.5×10$^5$ kg/cm$^2$
  Flexural break: 1,600 kg/cm$^2$
  Flexural modulus: 0.9×10$^5$
  Notched Izod impact: 43.5 kg-cm/cm

EXAMPLE 7

27.0 g (0.15 mole) of p-acetoxybenzoic acid, 27.0 g (0.15 mole) of m-acetoxybenzoic acid, 23.0 g (0.10 mole) of 2-acetoxynaphthalene-6-carboxylic acid, 73.8 g (0.30 mole) of 4,4'-biphenol diacetate and 49.8 g (0.30 mole) of terephthalic acid were stirred in a stream of nitrogen at 250° C. for 2.5 hours, and at 280° C. for 1 hour, and acetic acid was distilled off. Then, the degree of vacuum was gradually raised at 320° C. over the course of about 20 minutes. The reaction mixture was maintained at 0.1 torr for 30 minutes to terminate the reaction. After cooling, the polymer was finely pulverized, and dried at 150° C. while passing air.

The resulting polymer (about 140 g) had an intrinsic viscosity of 4.8.

The polymer was melt-extruded into continuous filaments (about 20 denier/filament), and quenched in the outer atmosphere (20° C., relative humidity 65%). The resulting filaments had the following mechanical properties.
  Tenacity: 14.5 g/denier
  Tensile modulus: 460 g/denier
  Elongation: 2.9%

When these filaments were heat-treated at 250° C. for 90 hours, they showed the following mechanical properties.
  Tenacity: 16.3 g/denier
  Tensile modulus: 480 g/denier
  Elongation: 3.9%

EXAMPLE 8

81.0 (0.45 mole) of p-acetoxybenzoic acid, 34.5 g (0.15 mole) of 2-acetoxynaphthalene-6-carboxylic acid, 38.8 g (0.20 mole) of hydroquinone diacetate and 33.2 g (0.20 mole) of terephthalic acid were stirred in a stream of nitrogen at 250° C. for 1 hour and then at 280° C. for 1 hour, and acetic acid was distilled off. Then, the degree of vacuum was raised gradually at 320° C. for about 30 minutes. The reaction mixture was maintained at 0.2 torr for 2 hours to terminate the reaction. After cooling, the polymer was finely pulverized, and dried at 150° C. for 1 hour.

The resulting polymer (about 127 g) had an intrinsic viscosity of 6.5.

The polymer was dried overnight in vacuum at 80° C., and then injection-molded at 310° C. The molded article had the following properties.
  Tensile break: 2,300 kg/cm$^2$
  Elongation: 2.5%
  Tensile modulus: 2.0×10$^5$ kg/cm$^2$
  Flexural break: 1,500 kg/cm$^2$
  Flexural modulus: 0.9×10$^5$ kg/cm$^2$
  Notched Izod impact: 28.0 kg-cm/cm

EXAMPLE 9

63.0 g (0.35 mole) of p-acetoxybenzoic acid, 34.5 g (0.15 mole) of 2-acetoxynaphthalene-6-carboxylic acid, 61.5 g (0.25 mole) of 4,4'-biphenol diacetate and 41.5 g (0.25 mole) of isophthalic acid were reacted by the same operation as in Example 8.

The resulting polymer (about 140 g) had an intrinsic viscosity of 5.3.

The polymer was dried overnight at 80° C., and injection-molded at 310° C. The molded article had the following properties.
  Tensile break: 1,900 kg/cm$^2$
  Elongation: 7.5%
  Tensile modulus: 0.6×10$^5$ kg/cm$^2$
  Flexural break: 1,300 kg/cm$^2$
  Flexural modulus: 0.5×10$^5$ kg/cm$^2$
  Notched Izod impact: 83.5 kg-cm/cm

EXAMPLE 10

In order to show the merit which is gained in the case where 2-hydroxynaphthalene-6-carboxylic acid or an aromatic polyester-forming derivative thereof is used in an amount of not more than about 18 mole %, there were prepared in the below-mentioned manner polymers for the preparation of which said compound was used in amounts of 18, 20, 25 and 30 mole %, respectively, and the inherent viscosity, melting point (measured by DSC) and heat deformation temperature under a load of 18.6 kg/cm$^2$ (measured according to ASTM D 648) of these polymers were measured.

A polymerization reactor was charged with 6-acetoxy-2-naphthalene carboxylic acid (HNA), p-acetoxy benzoic acid (HBA), 4,4'-biphenoldiacetate (BP) and terephthalic acid in a molar ratio mentioned in a table below. The polymerization reactor is a 5-l three-necked separable flask provided with a stirrer, a distillate cooler and a nitrogen gas inlet pipe, and the polymers were obtained in the following way:

The inside of the flask charged with the monomers was three times replaced with nitrogen, and then polymerization was carried out under a stream of nitrogen at 250° C. for 1 hour, at 280° C. for 1 hour, at 300° C. for 1 hour and at 320° C. for 1 hour. Then, the pressure was reduced at 320° C. in stages from normal pressure for about 2 hours until a level of several torr was reached. Then the polymerization was further carried out under a pressure of 1 torr or less for about 2 hours. However, in Experiment b, the polymerization was carried out under a pressure of 1 torr or less for 4 hours because the polymerization slowly proceeded. And, in Experiment d, since the viscosity of the system became so high that the melt polymerization could not be further continued, the polymerization under a pressure of 1 torr or less was carried out for only 1 hour.

| Experiment | Ratio of components (mole %) | | | | Inherent viscosity (I.V.) | Melting point (°C.) | Heat deformation temperature (°C.) |
|---|---|---|---|---|---|---|---|
| | HNA | HBA | BP | TPA | | | |
| a | 18 | 62 | 10 | 10 | 9.7 | 250 | 150 |
| b | 20 | 60 | 10 | 10 | 9.0 | 239 | 142 |
| c | 25 | 55 | 10 | 10 | 8.5 | 215 | 128 |
| d | 30 | 50 | 10 | 10 | 8.7 | 204 | 118 |

A comparison of Experiment a with Experiment b shows that a polymerization rate is lower in b where HNA content was 20 mole % than in a where HNA content was 18 mole %. That is, in b where the polymerization was carried out under vacuum as high as 1 torr or less for two hours longer than in a, the inherent viscosity of the resulting polymer was only 9.0 (the inherent viscosity of the resulting polymer in a was 9.7). The fact that a molecular weight fails to sufficiently increase as in b means that the polymerization fails to smoothly proceed. A tendency like this toward a decline in polymerization rate in the case where HNA is used in an increased amount is clearer from the results in Experiment c where the polymerization was carried out under quite the same conditions as those in a. That is, the inherent viscosity of the polymer in c is only 8.5.

When HNA was used in an increased amount of 30 mole %, as seen in Experiment d, before sufficient inherent viscosity was attained, melt viscosity became so high that the melt polymerization could not be further continued. The inherent viscosity of the resulting polymer was only 8.7.

The melting point becomes lower in the order of a, b, c and d. However, the melting point is not necessarily related in parallel to easy melt polymerization and easy molding. As described above, for instance, Experiment d, where the resulting polymer has the lowest melting point, is most inferior in melt polymerizability.

Further, it is made known from the above table that when HNA is used in an amount exceeding 20 mole %, the heat deformation temperature, i.e. heat resistance of the resulting molded article considerably lowers.

What is claimed is:

1. A process for producing an aromatic polyester, which comprises polycondensing an aromatic dicarboxylic acid selected from the group consisting of terephthalic acid, naphthalene-1,4-carboxylic acid, naphthalene-2,6-dicarboxylic acid, 4,4'-ethylenedioxydibenzoic acid, 4,4'-thiobisbenzoic acid, and the aromatic polyester-forming derivatives thereof; with an aromatic diol selected from the group consisting of 4,4'-biphenol, 2,6-naphthalene diol, hydroquinone, bisphenol A, 1,1'-thio-4,4'-biphenol, and the aromatic polyester-forming derivatives thereof; and with an aromatic hydroxycarboxylic acid other than 2-hydroxynaphthalene-6-carboxylic acid or the aromatic polyester-forming derivative thereof and with not more than about 18 mole %, based on the amount of the entire raw materials, of 2-hydroxynaphthalene-6-carboxylic acid or an aromatic polyester-forming derivative thereof.

2. The process of claim 1 wherein the amount of the 2-hydroxynaphthalene-6-carboxylic acid or its aromatic ester forming derivative is from about 2 to about 18 mole % based on the entire raw materials.

3. The process of claim 1 wherein the aromatic hydroxycarboxylic acid other than 2-hydroxynaphthalene-6-carboxylic acid is p-acetoxybenzoic acid or an aromatic polyester-forming derivative thereof.

4. The process of claim 3 wherein the aromatic dicarboxylic acid is selected from the group consisting of terephthalic acid, naphtalene-2,6-dicarboxylic acid or an aromatic polyester-forming derivative thereof.

5. The process of claim 4 wherein the aromatic diol is selected from the group consisting of 4,4'-biphenol, 2,6-naphthalene diol, hydroquinone or an aromatic polyester-forming derivative of any one of said diols.

6. The process of claim 5 wherein the amount of the 2-hydroxynaphthalene-6-carboxylic acid or its aromatic ester forming derivative is from about 18 mole % to about 10 mole % based on the entire raw materials.

* * * * *